United States Patent [19]

Crook, Jr.

[11] Patent Number: 4,512,062
[45] Date of Patent: Apr. 23, 1985

[54] LOAD BINDER HANDLE AND EXTENSION THEREFOR

[75] Inventor: Edward J. Crook, Jr., Tulsa, Okla.

[73] Assignee: The Crosby Group, Inc., Tulsa, Okla.

[21] Appl. No.: 451,871

[22] Filed: Dec. 21, 1982

Related U.S. Application Data

[63] Continuation-in-part of Ser. No. 357,048, Mar. 11, 1982.

[51] Int. Cl.³ .......................... A47B 95/02; B66F 3/00
[52] U.S. Cl. .................................... 24/71 R; 24/68 D; 24/68 CT; 24/270; 16/115; 254/243; 254/246
[58] Field of Search ................. 24/270, 71 R, 68 CT, 24/68 D; 254/243, 258, 246; 403/44; 16/114 R, 115

[56] References Cited

U.S. PATENT DOCUMENTS

| | | | |
|---|---|---|---|
| 161,435 | 3/1875 | Olson | 24/68 D |
| 614,519 | 11/1898 | Tramm | 254/243 |
| 1,031,508 | 7/1912 | Ashworth | 254/258 |
| 2,512,491 | 6/1950 | Durbin | 24/68 CT |
| 2,967,550 | 1/1961 | Rosenberger et al. | 254/246 |
| 3,149,821 | 9/1964 | Wallace | 24/270 |
| 3,726,507 | 4/1973 | Rymsza | 24/270 |
| 3,842,426 | 10/1974 | Ratcliff et al. | 24/270 |
| 3,954,252 | 5/1976 | Lyons | 24/270 |
| 3,988,005 | 10/1976 | Mooney et al. | 24/68 D |
| 4,070,932 | 1/1978 | Jeannotte | 16/115 |
| 4,366,607 | 1/1983 | MacCuaig | 24/270 |
| 4,376,397 | 3/1983 | Newby et al. | 16/115 |

*Primary Examiner*—Victor N. Sakran
*Attorney, Agent, or Firm*—Head, Johnson & Stevenson

[57] ABSTRACT

A load binder having a shortened handle with means to receive and interlock with a separate extension member, which is also adaptable to release the load binder.

5 Claims, 13 Drawing Figures

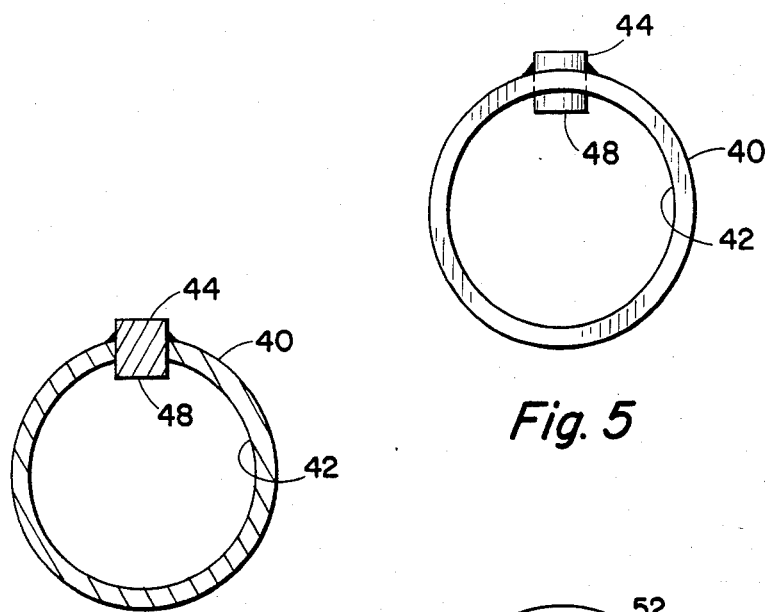
Fig. 5
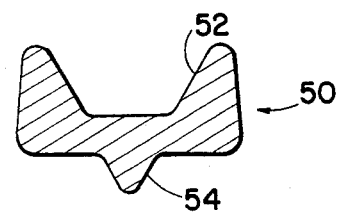
Fig. 7
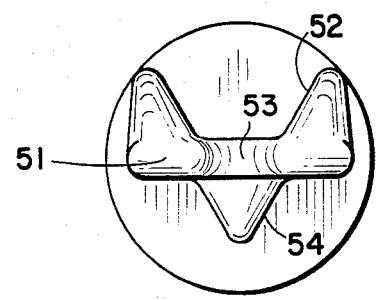
Fig. 6
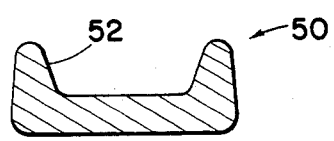
Fig. 8
Fig. 9

LOAD BINDER HANDLE AND EXTENSION THEREFOR

CROSS-REFERENCE TO RELATED APPLICATION

This is a continuation-in-part of co-pending application Ser. No. 357,048, filed Mar. 11, 1982 entitled "Load Binder with Removable Handle".

SUMMARY OF THE INVENTION

It is an object of this invention to provide an improved load binder for applying tension to a chain or other flexible load retaining element which surrounds items or material to retain them from moving.

A further object of this invention is to provide a load binder having a relative short handle which is useful in the initial stages of applying tension by taking up slack in the chain that surrounds the material.

A yet further object of the invention is to provide a removable extension handle, which, in cooperation with means on the short handle to be effectively locked therewith for the purposes of applying final over-center locking tension to the chain. The handle also includes means on the extension handle to pry the load binder from its over-center locking position to the position wherein the tension on the chain is released.

A still further object of this invention is to provide a load binder and a removable extension handle which has one end adaptable to releasing the load binder without the handle being attached to the load binder, permitting release of the tension on the chain or other flexible element yet permitting the operator to have full control over the extension handle.

Specifically, the invention is directed to a load binder that applies tension to a chain or other flexible load restraining element. The load binder comprises at least two link members adapted to be attached to the chain and includes other forms of attachment mechanisms at the end such as hooks and which are well known in the art. Although a chain is described, other flexible elements, i.e., cable are within the scope of the invention. The link members are pivotally interconnected by an actuator link that pivots between a relatively extended slack chain position to a relatively retracted chain tension position and locked in the retracted position by an over center concept. Once locked, the chain or other flexible member is held under tension around the load. The actuator link of this invention is comprised of a toggle arm and a handle that is attached thereto. The handle is relatively short, preferably a hand-breadth in length and is adapted to be utilized in the early stages of tensioning the load by removing as much slack as possible by a fairly simple hand operation. When the final over-center locking position is to be achieved, the handle of this invention is too short to obtain the usual tensioning lever-arm force. The invention includes an extension handle which is adapted to be inserted over the short handle and interlocked therewith. Movement of the extension handle then permits the over-center final tensioning position. Afterward, the extension handle is removed from the short handle and stored. When it is desired to release the load binder, the other end of the extension handle includes means for inter-engaging between the actuator link and one of the chain members with a pivoting action that releases the over-center position while permitting the operator to have full control over the extension handle. That is the extension handle does not follow the releasing movement of the actuator link.

BRIEF DESCRIPTION OF THE DRAWINGS

FIG. 5 is an end view taken taken toward the left side of FIG. 4.

FIG. 6 is an end view taken toward the right side of the view of FIG. 4.

FIGS. 7, 8 and 9 are sectional views taken along the lines 7—7, 8—8 and 9—9, respectively of FIG. 4.

FIG. 13 is a partial top view of the release portion of the extension handle.

DETAILED DESCRIPTION OF THE PREFERRED EMBODIMENT

Before explaining the present invention in detail, it is to be understood that the invention is not limited in its application to the details of the construction and arrangement of parts illustrated in the accompanying drawings. The invention is capable of other embodiments and of being practiced or carried out in a variety of ways consistent with the general principles involved. It is to be understood that the phraseology and terminology employed herein is for the purpose of description and not of limitation.

Figure 1:
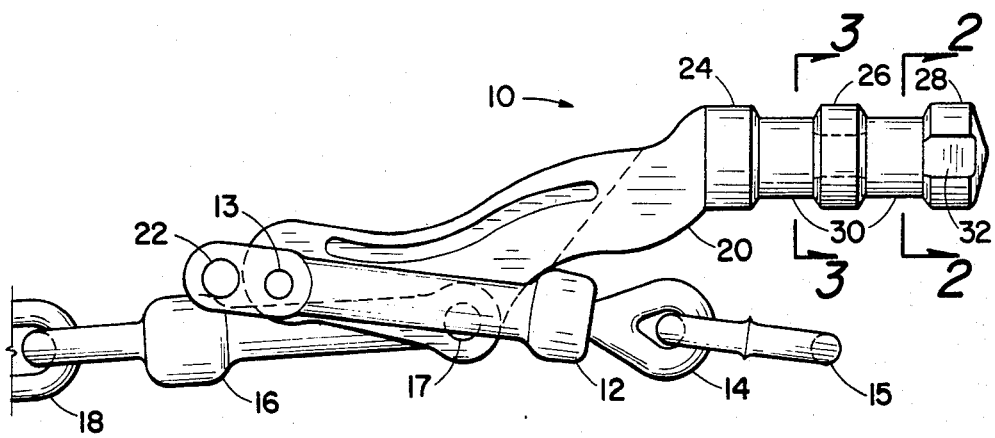
FIG. 1 is an elevational side view of the load binder according to this invention in the over-center locked position.
Figure 2:
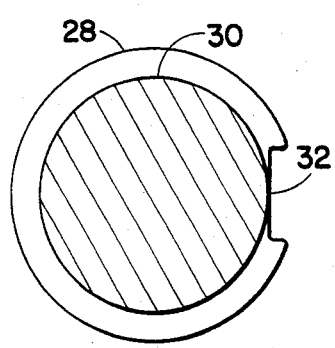
FIGS. 2 and 3 are sectional views taken along the line 2—2 and 3—3, respectively.
Figure 3:
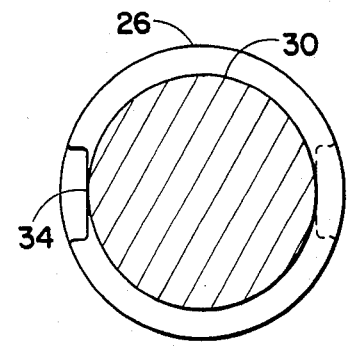
Figure 4:
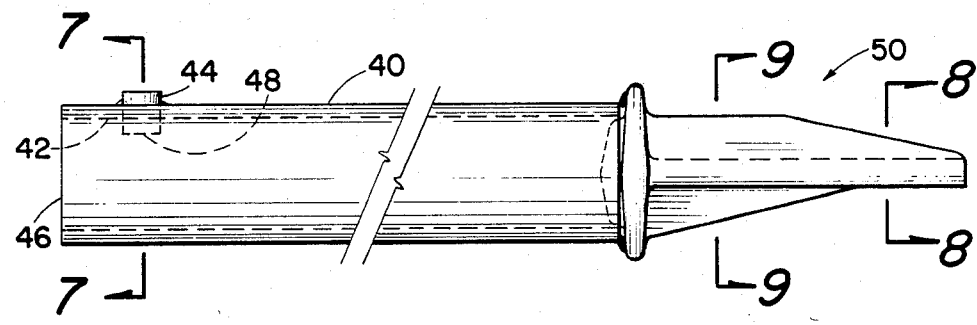
FIG. 4 is a side elevational view of the extension handle of this invention.

FIG. 1 illustrates the load binder according to the present invention and generally designated by the numeral 10. The binder 10 is made up of a U-shaped clevis 12 connected to swivel eye 14 and chain 15. A second swivel link 16 is connected to chain 18. A pivotal actuator link 20 interconnects swivel links 12 and 16 at respective pivot points 13 and 17. Link 12 includes as a part thereof an opening 22 within which a padlock or other means may be attached for securing the load binder in its locked position. The actuator link 20 includes a handle 24 approximately a hand breadth in length and having therein a gripping portion formed by raised cylindrical portions 26 and 28 from a smaller diameter rounded portion 30. Each of the raised surfaces, in this embodiment, include respective recesses 32 and 34 (See FIGS. 2 and 3) which are angularly disaligned with each other. That is, recess 32 is 180° from recess 34. These recesses are adaptable to be used with the extension handle described in FIG. 4. Referring now to FIGS. 4 through 9, the extension handle comprises a cylindrical body 40, having an opening therein 42 to telescopically receive the handle 24. A cylindrical member 44 is positioned adjacent the left end 46 and includes an interior protuberance 48 which, in use, will cause the interlocking of the extension body 40 with the handle 24 of the actuator link as hereinafter described. The length of the extension handle may vary with the type of load binder but will be that length which will provide the operator sufficient leverage power to toggle and lock the load binder in its over-center position and to release the load binder. At the right end of the extension body is the release portion generally designated by the numeral 50, its shape being best seen with reference to FIGS. 6, 8 and 9. In this embodiment, the release portion includes a U-shaped or V-shaped groove 52 having a strengthening rib 54 therebelow.

Figure 10:
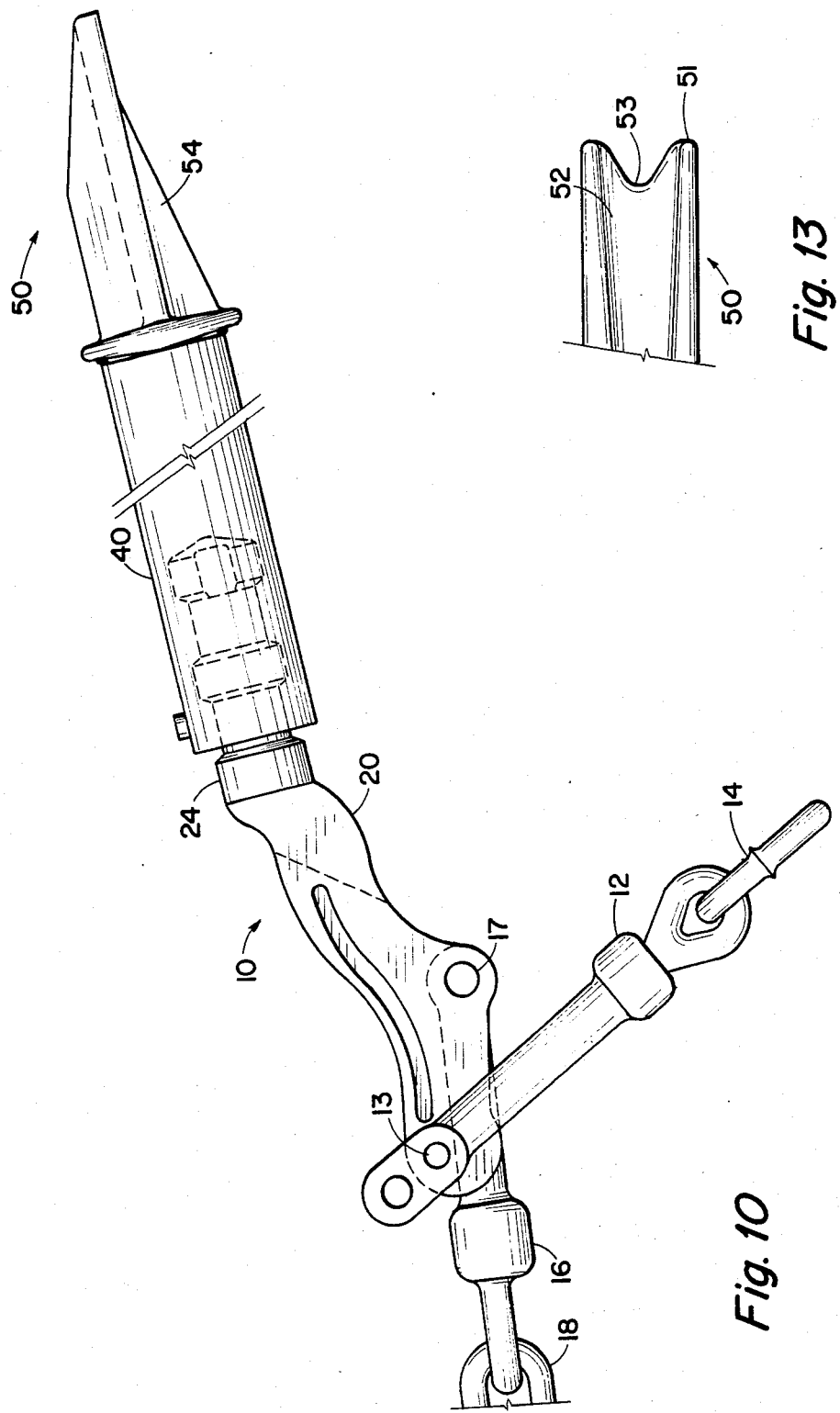
FIG. 10 is a side elevational view depicting the combination of the extension handle and the actuator link mechanism, depicting its use in applying the final tensioning position.
Figure 11:
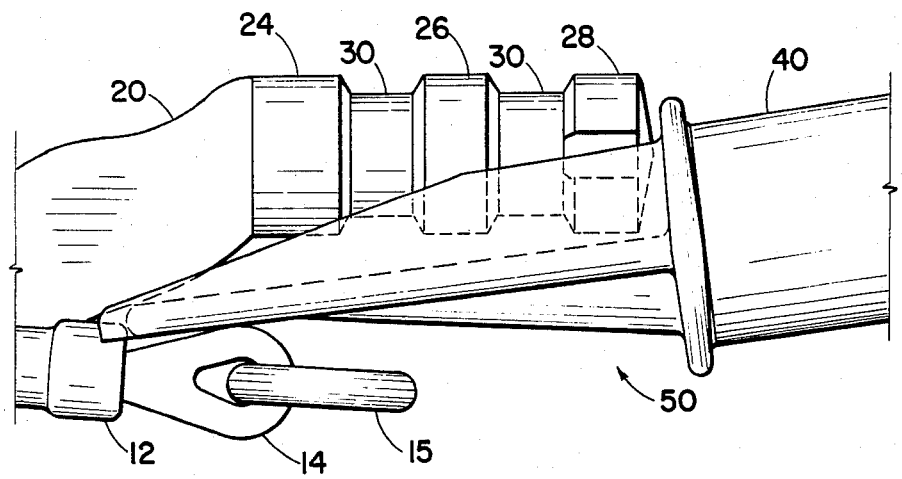
FIG. 11 is a partial side elevational view depicting the manner of releasing the load binder.

The use of the invention is best described in reference to FIGS. 10 and 11. As shown, the extension body 40 has been positioned and interlocked with the handle 24. This occurs by telescoping the opening 42 of extension 40 onto short handle 24, and by causing the protuberance 48 to enter recess 32. The extension handle is rotated 180° to where protuberance 48 will align with the recess 34 in portion 26 and axially moved thereacross. Further rotation of the handle locks the extension body to the handle 24. Removal occurs by the reverse action described. Prior to attachment of the extension body 40, the operator may take up slack by using the handle 24 until the final tensioning position is desired, at which time the extension body 40 is placed as previously described. Upon the application of a downward force the actuator link and its associated linkages are placed into the over-center locking position as shown in FIG. 1. The extension handle 40 is then removed and stored until it is time to release the load binder. The release of the load binder occurs by taking the release portion 50, and inserting it, as shown in FIG. 11 between the actuator link 20 and the link 12 and eye 14 and chain 15. Upward movement of the extension handle and body will cause the handle 24 to nest in groove 52, and cause the actuation link to return or toggle to the slack position releasing the restraining force.

Because of the design of the releasing portion, the handle 24 moves away rapidly while the operator maintains safe control of the extension housing or handle 40.

Figure 12:
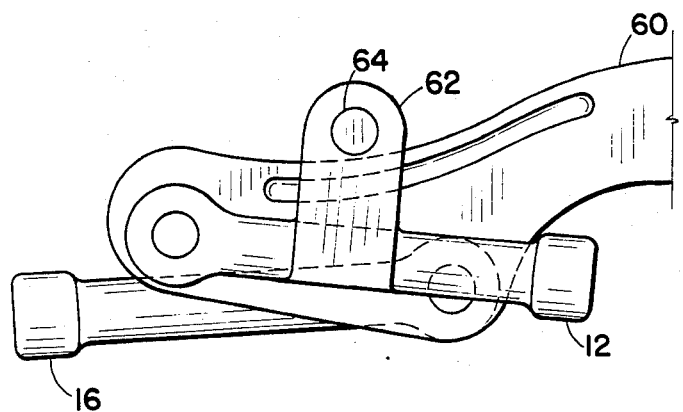
FIG. 12 is a side elevational view of an alternate embodiment.

FIG. 12 represents an alternate embodiment of the invention. The actuator link 60 is similar in all respects to actuator link 20 heretofore described. The distinction arises in the location of a locking arm 62 formed as a part of link 12. The locking arm includes an opening 64 in which a padlock or other means to retain the load binder in its off-center position is accomplished for safety and security purposes.

FIG. 13 represents the top of release portion 50 wherein the nose 51 includes a recess 53 therein in order to nest with the actuator link as shown in FIG. 11.

Other advantages of using an improved load binder of the present invention are numerous. Since the extension handle is removable, the load binder itself is more compact and less expensive, particularly in that one handle will operate a series of binders rather than each binder having an attached handle. The detachability of the handle and the fact that it is used to pry through a relatively small angle to release the load binder, are further characteristics. Considering that the force applied to the over-center locking tension position has to be similarly applied during the release of the load binder, the ease of operation of the load binder and its extension handle of this invention becomes apparent. More importantly, by selecting the appropriate length of the removable handle during the design stage of the load binder intentional over-loading situations can be sensed by the operator during the tensioning procedure. In addition, the compactness of the binder provides ease in handling because a lighter weight and the lack of the long handle.

What is claimed is:

1. In a load binder for applying tension to a chain or other flexible load retaining element wherein said load binder comprises at least two link members each adapted to attach to said chain or other flexible element, said link members being pivotally interconnected to an actuator link that pivots between a relatively extended slack chain position and a relatively retracted chain tension position wherein said actuator link being adapted to lock over-center thus holding said chain or said flexible member under said tension, the specific improvement comprising:

said actuator link comprised of a toggle arm and a handle rigidly formed thereto, said handle being substantially a hand-breadth in length; and a removable extension, said extension including means at one end to interconnect and interlock with said handle and means at the other end to release said over-center locking tension position.

2. In a load binder for applying tension to a chain or other flexible load retaining element wherein said load binder comprises at least two link members one end of each adapted to attach to said chain or other flexible element, said link members being pivotally interconnected to an actuator link that pivots between a relatively extended slack chain position and a relatively retracted chain tension position wherein said actuator link is adapted to pivot and retain said link members in an over-center position to hold said chain or said flexible member under said tension, the specific improvement comprising:

said actuator link comprised of a toggle arm and a handle rigidly formed thereto, said handle being substantially about a hand-breadth in length, said handle having a plurality of spaced circumferential raised surfaces thereon, a recess coaxial with said handle, across each of said raised surfaces, each of said recesses being unaligned with each other, a removable extension housing, means at one end of said extension housing to rotatably telescope over said handle, a protuberance inside said extension adaptable to pass through said recesses when aligned therewith as said extension handle is rotated and telescoped onto said handle, a tapered portion at the other end of said extension housing, said portion being U-shaped in cross section.

3. In a load binder for applying tension to a chain or other flexible load retaining element wherein said load binder comprises at least two link members each adapted to attach to said chain or other flexible element, said link members being pivotally interconnected to an actuator link that pivots between a relatively extended slack chain position and a relatively retracted chain tension position wherein said actuator link being adapted to lock over-center thus holding said chain or said flexible member under said tension, the specific improvement comprising:

said actuator link comprised of a toggle arm and a handle rigidly formed thereto, said handle being substantially about a hand-breadth in length, and with a hand grip surface thereon;

a removable extension, said extension including means at one end to interconnect with said hand grip surfaces so as to be interlocked therewith, a tapered portion at the other end of said extension said tapered portion being U-shaped in cross section.

4. The load binder of claim 3 wherein the terminus of said other end includes a second U-shaped recess that is transverse to said tapered U-shaped portion.

5. In a load binder for applying tension to a chain or other flexible load retaining element wherein said load binder comprises at least two link members one end of each adapted to attach to said chain or other flexible element, said link members being pivotally interconnected to an actuator link that pivots between a relatively extended slack chain position and a relatively retracted chain tension position wherein said actuator link is adapted to pivot and retain said link members in an over-center position to hold said chain or said flexible member under said tension, the specific improvement comprising:

said actuator link comprised of a toggle arm and a handle rigidly formed thereto, said handle being substantially about a hand-breadth in length, said handle having a plurality of circumferential raised surfaces thereon, a recess, coaxial with said handle, across each of said raised surfaces, each of said recesses being unaligned with each other, a removable extension housing, means at one end of said extension housing to rotatably telescope over said handle, a protuberance inside said extension adaptable to pass through said recesses when aligned therewith as said extension handle is rotated and telescoped onto said handle, a tapered portion at the other end of said extension housing, said portion being U-shaped in cross section, and the terminus of said other end having a second U-shaped recess that is transverse to said tapered U-shaped portion.

* * * * *